Inventors
RUDOLF FLÖTGEN
KARL KALB
BY: Toulmin & Toulmin
ATTORNEYS

July 10, 1962 R. FLÖTGEN ET AL 3,043,735
METHOD FOR PRODUCING MICA LAYERS FOR ELECTRICAL INSULATION
Filed Dec. 10, 1957 3 Sheets-Sheet 2

Inventors
RUDOLF FLÖTGEN
KARL KALB
BY: Toulmin & Toulmin
ATTORNEYS

United States Patent Office 3,043,735
Patented July 10, 1962

3,043,735
METHOD FOR PRODUCING MICA LAYERS FOR ELECTRICAL INSULATION
Rudolf Flötgen and Karl Kalb, Kassel, Germany, assignors to Licentia Patent-Verwaltungs-GmbH, Hohe Bleichen, Hamburg, Germany
Filed Dec. 10, 1957, Ser. No. 701,884
Claims priority, application Germany Dec. 10, 1956
14 Claims. (Cl. 156—27)

The present invention relates to electrical insulators employing mica. More in particular, the present invention relates to a method for producing layers of mica for electrical insulators.

It is known in the art to produce electrical insulators from layers of mica flakes deposited on a base. This is a difficult process particularly in view of the fact, that several mica flakes tend to stick to each other so as to form small packages. These packages must be separated prior to depositing the mica flakes on the base and it has proved to be very difficult or even impossible to do this in a satisfactory manner by mechanical means. It has therefore been proposed to depose flakes of mica on a base by an electrostatic spray process so as to form layers of mica on the base. It was hoped that thereby only separated mica flakes were deposited on the base. The mica flakes were to be bonded by a suitable binder sprayed upon the base and/or the mica particles moving in the electrostatic field by suitable spraying devices as, for example, electrostatic spray means of the type used for spraying varnish using a high voltage source (see, for instance, the Swiss Patent 312,389).

It will be easily apparent that this process necessitates a delicate and accurate control of the quantity of binder which must be conditioned upon the added quantity of mica. This control calls for additional and complicated control means.

The electrostatic spray process has encountered further difficulties. In particular, it has proved to be impossible to separate all of the individual mica flakes from each other, thus making it impossible to depose on the base via the electrostatic field each particular mica flake individually and separately, and hence entire small packages of several mica flakes being attached to each other are deposited on the base. This results in an undesirable thickness of the layer of mica and in an irregular thickness of this layer. Above all, the binder is prevented from reaching the surfaces of the mica flakes attached to each other and, consequently, the bonding effect is still unsatisfactory.

In the known process for producing layers of mica by electrostatic means (which is described, for example, in the Swiss patent supra), the mica flakes must be moved along a zig-zag path between D.C. voltage electrodes if a sufficient separation and the desired equal distribution of the mica flakes is to be achieved. To effect this movement, the mica flakes have to be recharged, i.e., their polarity has to be reversed repeatedly. If the ability of the mica flakes to adsorb and discharge electrons repeatedly is insufficient, the desired separation of the individual flakes cannot be accomplished. Unfortunately, however, this ability of the mica flakes to adsorb and discharge electrons repeatedly is insufficient and, under normal conditions, even decreases in direct proportion to an increase of the surface area of the mica flakes tending to form a bridge between the electrodes. As a consequence, the mica flakes are not properly separated and entire packages of mica are deposited on the base. This leads to an undesirable irregularity and thickness of the mica layer.

It has also been found that a dry coating of a binder applied to the mica flakes cannot eliminate these drawbacks.

It is an object of the present invention to provide a method for producing layers of mica deposited on a base for use as electrical insulators, whereby an excellent bonding effect of the mica flakes forming the layers on the base is achieved.

It is another object of the present invention to provide a method for producing layers of mica deposited on a base for use as electrical insulators, whereby layers of mica flakes are obtained which have a regular and even and not an excessive thickness.

It is yet another object of the present invention to provide a method for producing layers of mica deposited on a base for use as electrical insulators, whereby the mica flakes are well separated and only single mica flakes are deposited on the base.

It is a further object of the present invention to provide a method for producing layers of mica deposited on a base for use as electrical insulators, requiring a greatly reduced quantity of binder.

These objects are achieved by the method of the present invention according to which the mica flakes are moistened with a wetting liquid and then are applied to a base by electrostatic spray process known per se and used particularly for spraying varnish.

In one embodiment of the invention, the mica flakes are wetted by condensing vapor in an air conditioning chamber. It will be of advantage to arrange the storage and feeding means for storing and delivering the mica to the electrodes inside of this climate chamber.

According to another embodiment of the present invention the mica flakes are wetted in the processing apparatus as, for example, in the mixer in which the flakes are wetted with a liquid agent in the liquid phase. The mica flakes are well separated from each other in the mixer and then are brought into close contact with a bonding agent as well as a solvent and possibly an additional wetting agent. Hence, every individual mica flake is uniformly provided with a thin film of a binder and a wetting agent and an excellent separation of the mica flakes and, thereafter, an excellent bonding effect is obtained.

According to still another, preferred embodiment of the present invention the mica flakes are first subjected to a thorough cleaning process preferably carried out by supersonic treatment under water, prior to being wetted and deposited on the base.

Suitable wetting agents are, for example water or an organic liquid like alcohol or toluene.

Suitable solvents are water and liquids which can be used as solvents for synthetic resins. Such liquids are, for example, alcohols, esters, ketones like acetone or methyl ethyl ketone, and aromatic compounds like xylene, toluene and mixtures thereof.

Suitable binders are, for example, natural and synthetic resins which are used to bond mica layers. Other examples are shellac, alkyd resins, epoxy resins and unsaturated polyesters or silicone resins as well as their modifications.

The invention will be more fully appreciated upon the following description of the accompanying drawings, wherein—

The mica flakes are entered into an air conditioning chamber in which a film of wetting liquid is applied to the mica flakes by condensing vapor. This process can be carried out, for example, with saturated vapor. Either simultaneously with this wetting process or thereafter, the mica flakes are provided with a cover of a bonding agent. As a mica sticking and bonding varnish, shellac is very widely used. It is, however, also possible to employ synthetic resins (see, for example, the synthetic resins described in the Patent 2,656,290).

As a wetting agent, solvents can be used, as listed, for example, in the Standard Handbook for Electrical Engineers, 8th ed., section 4–402, Table 4–63, and in the patent supra.

Figure 1:
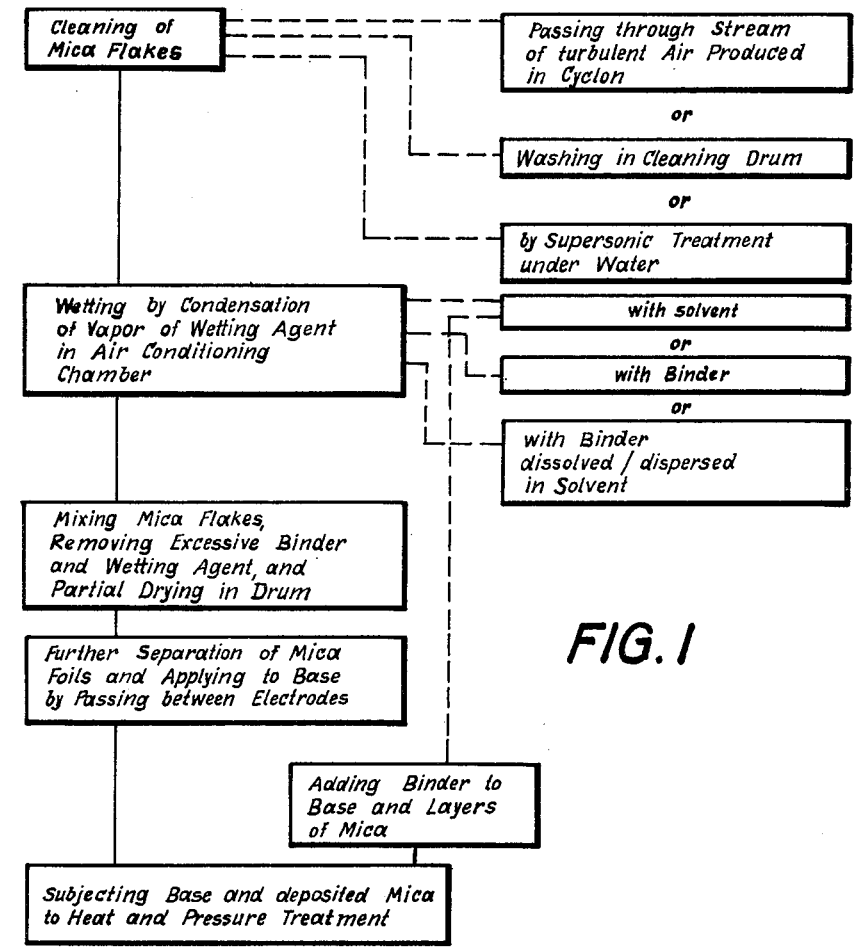
FIGURE 1 is a flow-sheet illustrating one embodiment of the present invention, which the wetting is effected by condensing vapor.

The binder can be dissolved or dispersed in the solvent. If only a solvent is applied during this stage of the process, the binder can be added to the base before and to each layer of mica flakes after one layer of flakes has been deposited on the base. It is, however, also possible to use a binder only (for example a varnish), which binder simultaneously serves as a wetting agent. Furthermore, a solvent, a binder and an additional wetting agent can be used (see FIGURES 1 and 2).

The mica flakes are then introduced into a suitable drying apparatus as, for example, a rotary drier, in which the excessive liquid of the solving agent and bonding agent is removed. The flakes are also thoroughly mixed in the rotary drier and prevented from sticking to each other. The mica flakes are also partially dried but only to such an extent that a certain moisture is retained on their respective surfaces so as to retain the ability to adsorb and discharge electrons. The mica flakes are then conveyed to electrostatic means (see the Swiss patent supra) further separating the packages of flakes and applying the single flakes to a suitable base so that a uniform layer of predetermined and even thickness is obtained. The base can be composed of insulating fabrics of cotton, linen, silks, or of paper and the like materials.

Finally, the flakes deposited on the base are subjected to a heat and pressure treatment in a manner known per se and are thereby firmly attached to each other and to the base.

Figure 2:
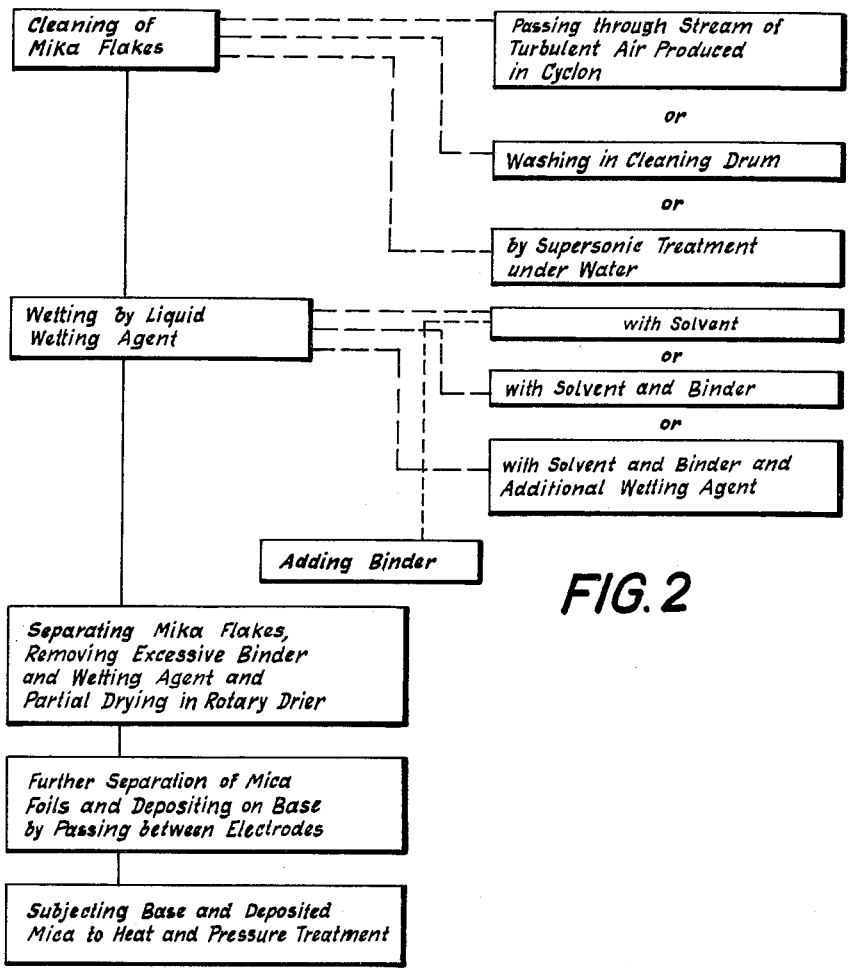
FIGURE 2 is another flow-sheet illustrating another embodiment of the present invention, in which the wetting is effected from the liquid phase.
Figure 3:
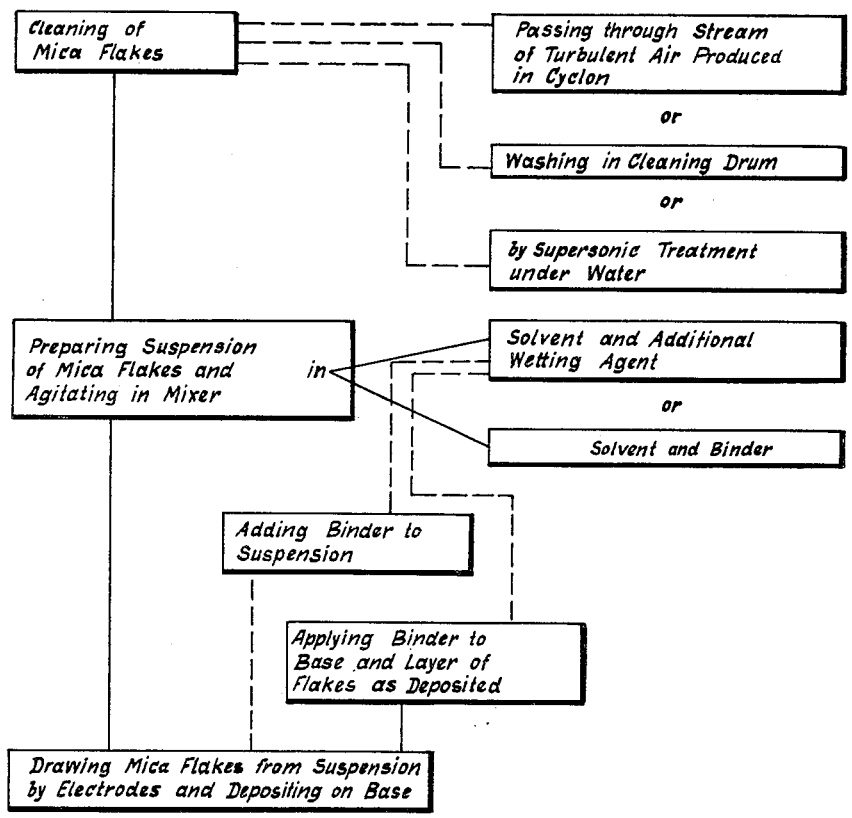
FIGURE 3 is still another flow-sheet illustrating a modification of the embodiment of the invention illustrated in FIGURE 2, and in which the mica flakes are wetted in a suspension.

According to another embodiment of the invention, the wetting of the mica flakes is done by a wetting agent (a solvent, and/or binder, or a solvent, a binder, and an additional wetting agent) in the liquid phase (see FIGURE 2). It is also possible, to prepare a suspension of mica flakes in a solvent and/or a binder (and, if desired, an additional wetting agent), to agitate this suspension in a mixer and to draw mica flakes directly from this suspension by suitable electrodes (see further below) and to deposit these flakes on the base (see FIGURE 3).

According to yet a further, preferred embodiment of the invention, the mica flakes are first cleaned from mica dust, sand and other impurities. This cleaning can be effected in several manners, for example, by entering the mica flakes into a turbulent stream of air produced in a cyclon or the mica is cleaned with water in a suitable washing device. An excellent separation and cleaning of the individual mica flakes is effected by supersonic treatment particularly if carried out under water (see the first step in FIGURES 1, 2, 3).

Figure 4:
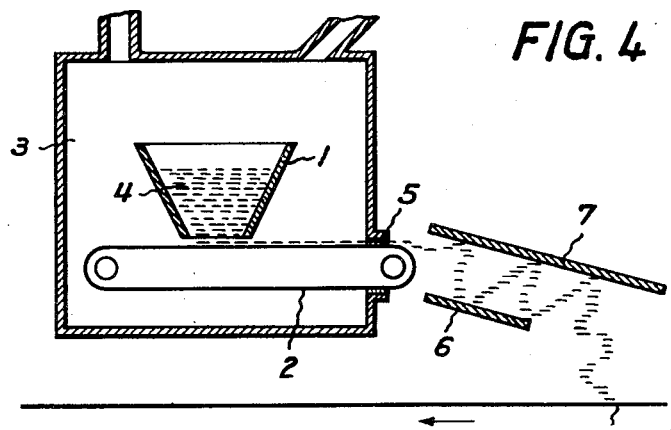
FIGURE 4 is a schematic view illustrating an apparatus for carrying out the method of the invention illustrated in FIGURE 1.

An apparatus for carrying out the process of the present invention in which vapor is condensed on the mica, is shown in FIGURE 4. The air conditioning chamber 3 encloses a storage vessel 1 containing the mica flakes 4, and which is disposed above the conveyor belt 2. The desired degree of moisture and saturation as well as temperature and pressure in the air conditioning chamber are achieved and maintained by means known per se. The mica flakes which may already have received a cover of the bonding agent after previous cleaning, are now provided with a film of wetting liquid due to the condensation of the vapor in the air conditioning chamber 3. The conveyor belt 2 transports the mica flakes through the well sealed opening 5 upon the grounded electrode surface 6 which is opposite another electrode 7 and is slightly inclined downwardly. The electrode 6 and the electrode 7 produce an electrostatic field causing to move the mica flakes back and forth between the electrode and simultaneously in a downwardly direction, thus to follow a zig-zag course, until the flakes tumble upon the base 8 and form a regular and even layer composed of individual, single mica flakes. The layer of mica flakes is still comparatively loose and the flakes are bonded to each other and to the base by heat and pressure.

The desirable effect of separating and evenly distributing the single mica flakes can be further increased by causing the electrodes to vibrate by suitable vibrating means as described, for example, in the Swiss patent supra.

Figure 5:
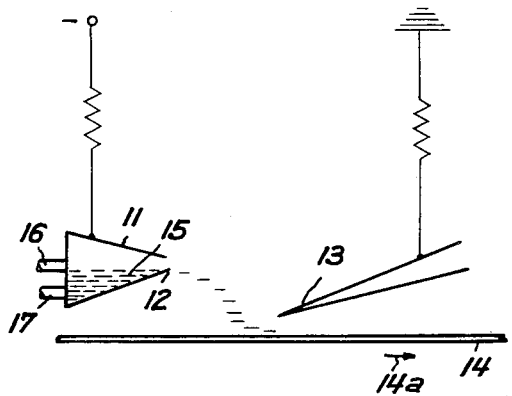
FIGURE 5 is another schematic view illustrating an electrode arrangement for depositing the mica flakes processed as illustrated in FIGURE 3.

FIGURE 5 shows an apparatus for carrying out the embodiment of the method of the invention according to which a suspension is prepared containing the mica flakes, whereupon the flakes are drawn from this suspension and deposited on the base.

The suspension 15 is prepared in a conventional mixer (not shown) and is then entered into the bucket shaped electrode 11 via the pipe sockets 16 and 17. The electrode 11 is connected to a high voltage source and has an upwardly directed portion 12, the outermost rim of which serves as a spray edge. The base 14 can be moved continuously in the direction of the arrow 14a. Opposite to the electrode 11 and at a predetermined distance therefrom, there is arranged another electrode 13 which is grounded and which is so disposed relative to the electrode 11 and the base 14 that the lines of force forming between the electrodes 11 and 13 follow a tangential course relative to the base 14.

The electrode 13 draws the mica flakes coated with a binder and solvent from the suspension 15 over the spray rim 12 of the electrode 11. The predetermined distance between the electrode 11 and its spray rim 12 on the one hand, and the electrode 13 on the other hand, is so chosen that the mica flakes do not reach the electrode 13 but leave the field formed between the electrodes because of their proper weight and tumble upon the base 14. When falling, the mica flakes assume a parallel position relative to the lines of force and therefore come to reach the base in substantially parallel position relative to the latter.

The following examples further illustrate the method of the invention.

The mica flakes are introduced into a storage vessel (FIG. 4) at about 40° C. and 90% R.H. Upon introduction of the mica into said vessel, a liquid film is formed on the surface of the mica flakes. The mica flakes thus wetted with a liquid film are applied to a high voltage electrode and are evenly distributed in particulate form onto a surface by using about 15 to 30 kv. D.C. under the effect of the electrostatic field in direction to the counter electrode. On the surface, the mica flakes form a layer of flat mica flakes. An improved scatter effect and better distribution are attained with respect to the mica flakes because of the wetting film.

According to another example, the mica flakes are sprayed with a binder consisting of a 20% shellac solution in alcohol prior to electrostatic spraying from a high voltage electrode. The mica flakes coated with a thin liquid film of the organic shellac can be easily sprayed in layer form onto a surface according to the electrostatic spraying method.

Advantages

The method of the present invention offers great advantages. The wetting of the surfaces of the mica flakes increases the ability of the flakes to adsorb and discharge electrons and thereby facilitates their passing between the electrodes along a zig-zag path. Consequently, mica flakes adhering to each other and forming small packages are well separated from each other. Only single flakes of mica are thus deposited on the base and a regular and even layer is formed. In addition, the binder applied to the mica flakes evenly coats the surface of every single mica flake and an excellent bonding effect is achieved.

A good separation can also be obtained even prior to passing the flakes between the electrodes by thoroughly agitating the flakes provided with the coating of the solvent, wetting agent, and binder; this can be done in a conventional rotary drier.

By subjecting the mica to a thorough cleaning process the above mentioned advantageous effects are further increased. In addition, large economies can be made of the necessary binding agent. It has been found that in the case of mica flakes having a diameter of from 3 to 10 millimeters, an amount of binder has to be added which is in the order of at least 15 to 20 weight/volume percent of the mica flakes, whereas only 5% of binder are needed if the mica flakes are subjected to the cleaning process prior to wetting and further processing the same. Although the amount of the binder is thus greatly reduced, the layers of mica for electrical insulation produced according to this preferred embodiment of the method of the present invention have at least the same excellent mechanical and electrical property as the layers of mica flakes produced by the basic embodiment of the process of the present invention (i.e.) without prior cleaning.

It will be understood that this invention is susceptible to modification in order to adapt it to different usages and conditions, and, accordingly, it is desired to comprehend such modifications within this invention as may fall within the scope of the appended claims.

What we claim is:

1. A method for producing layers of mica for electrical insulation composed of flakes of mica deposited on a base, comprising the steps of preparing a suspension of mica flakes in a solvent containing a binder and agitating the suspension in a mixer, and electrostatically charging the mica flakes at a predetermined potential of a high voltage source for drawing the mica flakes from the suspension, scattering them and depositing them onto a base so as to form layers of mica.

2. A method for producing layers of mica for electrical insulation composed of flakes of mica deposited on a base, comprising the steps of preparing a suspension of mica flakes in a solvent containing an additional wetting agent and agitating the suspension in a mixer, adding a binder to the suspension, and electrostatically charging the mica flakes at a predetermined potential of a high voltage source for drawing the mica flakes from the suspension, scattering them and depositing them onto a base so as to form layers of mica.

3. A method for producing layers of mica for electrical insulation composed of flakes of mica deposited on a base, comprising the steps of preparing a suspension of mica flakes in a solvent containing an additional wetting agent and agitating the suspension in a mixer, depositing a binder on a base, electrostatically charging the mica flakes at a predetermined potential of a high voltage source for drawing the mica flakes from the suspension, scattering them and depositing them onto a base so as to form layers of mica, and applying a binder to the layers.

4. A method for producing layers of mica for electrical insulation composed of mica flakes deposited on a base, comprising the steps of wetting the surface of the mica flakes, charging the mica flakes in a high potential field, and electrically spraying the charged mica flakes onto a base so that they deposit and form layers of mica.

5. A method for producing layers of mica for electrical insulation composed of mica flakes deposited on a base, comprising the steps of wetting the surface of the mica flakes with a solvent, charging the mica flakes at a predetermined potential of a high voltage source, and electrically spraying the charged mica flakes onto a base so that they deposit and form layers of mica.

6. A method for producing layers of mica for electrical insulation composed of mica flakes deposited on a base, comprising the steps of wetting the surface of the mica flakes with a binder, charging the mica flakes at a predetermined potential of a high voltage source, and electrically spraying the charged mica flakes onto a base so that they deposit and form layers of mica.

7. A method for producing layers of mica for electrical insulation composed of mica flakes deposited on a base, comprising the steps of wetting the surface of the mica flakes with a binder dissolved in a solvent, charging the mica flakes at a predetermined potential of a high voltage source, and electrically spraying the charged mica flakes onto a base so that they deposit and form layers of mica.

8. A method for producing layers of mica for electrical insulation composed of mica flakes deposited on a base, comprising the steps of wetting the surface of the mica flakes with a binder dispersed in a solvent, charging the mica flakes at a predetermined potential of a high voltage source, and electrically spraying the charged mica flakes onto a base so that they deposit and form layers of mica.

9. A method for producing layers of mica for electrical insulation composed of mica flakes deposited on a base, comprising the steps of wetting the surface of the mica flakes with a solvent containing a binder and an additional wetting agent, charging the mica flakes at a predetermined potential of a high voltage source, and electrically spraying the charged mica flakes onto a base so that they deposit and form layers of mica.

10. A method for producing layers of mica for electrical insulation composed of mica flakes deposited on a base, comprising the steps of wetting the surface of the mica flakes with a wetting agent, mechanically agitating the mica flakes so as to separate flakes adhering to each other, charging the mica flakes at a predetermined potential of a high voltage source, and electrically spraying the charged mica flakes onto a base so that they deposit and form layers of mica.

11. A method for producing layers of mica for electrical insulation composed of mica flakes deposited on a base, comprising the steps of cleaning the mica flakes, wetting the surface of the mica flakes with a wetting agent, mechanically agitating the mica flakes so as to separate flakes adhering to each other, charging the mica flakes at a predetermined potential of a high voltage source, and electrically spraying the charged mica flakes onto a base so that they deposit and form layers of mica.

12. A method for producing layers of mica for electrical insulation composed of mica flakes deposited on a base, comprising the steps of cleaning the mica flakes by supersonic treatment under water, wetting the surface of the mica flakes with a wetting agent, mechanically agitating the mica flakes so as to separate flakes adhering to each other, charging the mica flakes at a predetermined potential of a high voltage source, and electrically spraying the charged mica flakes onto a base so that they deposit and form layers of mica.

13. A method for producing layers of mica for electrical insulation composed of mica flakes deposited on a base, comprising the steps of passing the mica flakes into an air conditioning chamber containing a wetting agent in the vapor phase and causing the vapor to condense upon the surfaces of the mica flakes, and charging the mica flakes at a predetermined potential of a high voltage source, and electrically spraying the charged mica flakes onto a base so that they deposit and form layers of mica.

14. A method for producing layers of mica for electrical insulation composed of mica flakes deposited on a base, comprising the steps of cleaning the mica flakes by supersonic treatment under water, introducing the mica flakes into an air conditioning chamber containing a saturated vapor of a wetting agent having normal pressure and room temperature and causing the vapor to condense upon the surfaces of the mica flakes, introducing the wetted mica flakes into a rotary drier and partly drying and mechanically agitating the mica flakes so as to separate flakes adhering to each other, and charging the mica flakes at a predetermined potential of a high voltage source, and electrically spraying the charged mica flakes onto a base so that they deposit and form layers of mica.

References Cited in the file of this patent

UNITED STATES PATENTS

| | | |
|---|---|---|
| 2,430,123 | Jacob | Nov. 4, 1947 |
| 2,549,880 | Bardet | Apr. 24, 1951 |
| 2,614,055 | Senarclens | Oct. 14, 1952 |
| 2,763,315 | Berberich et al. | Sept. 18, 1956 |
| 2,791,262 | Bodnick | May 7, 1957 |